US006685872B2

(12) United States Patent
Dooley et al.

(10) Patent No.: US 6,685,872 B2
(45) Date of Patent: Feb. 3, 2004

(54) METHOD FOR PREPARING MULTILAYER FILMS

(75) Inventors: Joseph Dooley, Midland, MI (US); Steve R. Jenkins, Clare, MI (US); John A. Naumovitz, Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 55 days.

(21) Appl. No.: 09/899,614

(22) Filed: Jul. 3, 2001

(65) Prior Publication Data

US 2002/0028309 A1 Mar. 7, 2002

Related U.S. Application Data

(60) Provisional application No. 60/217,918, filed on Jul. 13, 2000.

(51) Int. Cl.[7] .............................................. B29C 47/06
(52) U.S. Cl. .................. 264/514; 264/563; 264/171.26; 264/173.16; 264/209.8
(58) Field of Search .............................. 264/514, 563, 264/171.26, 171.27, 173.16, 209.1, 209.8, 515

(56) References Cited

U.S. PATENT DOCUMENTS

| 3,477,099 A | | 11/1969 | Lee et al. |
| 3,809,515 A | * | 5/1974 | Farrell ..................... 425/133.1 |
| 3,890,083 A | * | 6/1975 | St. Eve ........................ 425/462 |
| 4,076,568 A | * | 2/1978 | Kubat et al. ................. 156/229 |
| 4,268,239 A | * | 5/1981 | Herrington, Jr. ............ 425/467 |
| 4,365,949 A | | 12/1982 | Nash |
| 4,643,927 A | | 2/1987 | Luecke et al. |
| 4,842,791 A | | 6/1989 | Gould et al. |
| 4,944,972 A | * | 7/1990 | Blembereg ................. 428/35.2 |
| 5,190,711 A | * | 3/1993 | Blemberg .............. 264/173.13 |
| 5,538,411 A | * | 7/1996 | Gates ....................... 425/133.1 |
| 5,716,650 A | * | 2/1998 | Mavridis ................. 425/131.1 |
| 5,843,490 A | * | 12/1998 | Horiba et al. ............... 425/380 |
| 6,190,152 B1 | * | 2/2001 | Cree ....................... 425/133.1 |
| 6,485,283 B1 | * | 11/2002 | Yamaguchi et al. ....... 425/72.1 |

OTHER PUBLICATIONS

Japan Patent Abstract for JP 55–030921.
Japan Patent Abstract for JP 59–209122.

\* cited by examiner

*Primary Examiner*—Mark Eashoo

(57) ABSTRACT

A method for coextruding a multilayer tubular film having a barrier material comprises (a) extruding a core extrudate of barrier material with a core extruder; (b) providing a preencapsulation die adjacent the outlet of the core extruder, the prencapsulation die capable of producing a non-uniform layer thickness; (c) extruding a preencapsular extrudate of preencapsular material and directing said preencapsular extrudate to the preencapsulation die; (d) joining the core extrudate and the preencapsular extrudate in the preencapsulation die in a coaxial relationship wherein the preencapsular extrudate is disposed radially outwardly of the core extrudate to form a preencapsulated core extrudate having a non-uniform layer thickness; (e) extruding an inner layer extrudate and an outer layer extrudate; (f) feeding the preencapsulated ore extrudate through a distribution manifold to a coextrusion die, the distribution manifold designed to overlap opposing longitudinally extending edges; and (g) forming a multilayer blown film having the inner layer extrudate disposed radially inwardly of the preencapsulated core extrudate and the outer layer extrudate disposed radially outwardly of the preencapsulated core extrudate. In preferred embodiments the inner layer extrudate and the outer layer extrudate are joined to the preencapsulated core extrudate before, or alternatively while, the preencapsulated core extrudate is fed through the coextrusion die.

19 Claims, 4 Drawing Sheets

METHOD FOR PREPARING MULTILAYER FILMS

This application claims the benefit of U.S. Provisional Application No. 60/217,918, filed Jul. 13, 2000.

BACKGROUND OF THE INVENTION

The present invention relates generally to multilayer, tubular films and to methods and apparatus for making such films. More particularly, the invention relates to tubular, polymer films containing a barrier layer and having uniform barrier properties around the circumference of the tube.

Film structures including a barrier layer such as polyvinylidene chloride have been difficult to extrude in tubular form. Extrusion of polyvinylidene chloride presents special problems. One problem results from the thermal degradation of the polymer which can occur in the extrusion die. To overcome this, polyvinylidene chloride has been encapsulated in an encapsulating material which does not exhibit the thermal degradation of polyvinylidene chloride.

Another problem which arises in the formation of polyvinylidene chloride into a tubular film is the seam which is formed. The seam extends along a weld line on one side of the extrudate. Generally, the extrusion die used to produce a tubular extrudate defines an annular chamber into which the extrusion material is forced. The material separates into two substreams which flow in opposite directions around the annular chamber, meeting on the opposite side of the chamber where they recombine. The streams then exit from the annular opening, and define a weld line at the point of recombination.

If an encapsulated layer of a barrier material such as polyvinylidene chloride is extruded in this way, the polyvinylidene chloride core does not recombine along the weld line. Only the encapsulating material recombines at the weld line. Since the encapsulating material has a much higher gas transmission rate than polyvinylidene chloride, the tubular film has higher gas transmission properties at the weld line than in the rest of the tubular film. This is unacceptable in many applications.

U.S. Pat. No. 4,643,927, to Luecke et al., which is incorporated herein by reference, suggests one solution to this problem. Luecke discloses a multilayer film having a central layer of barrier material which overlaps itself by a substantial distance along the weld line. The patent states that an overlap of two thirds of one inch in the barrier layer along the weld line is sufficient to provide a film in which the oxygen transmission rate along the weld line is no greater than in other portion of the film.

While Luecke represents a significant improvement in the manufacture of tubular barrier films, problems still remain. Blown films containing polyvinylidene chloride can only be produced on small dies (those having a diameter of less than about 8 inches).

Furthermore, even these small blown film dies can only be operated for about 1 to 4 weeks before the line must be shut down and cleaned. Because of its thermal degradability, polyvinylidene chloride has a tendency to "carbonize" in the extrusion equipment. Carbonization results in the formation of small carbon particles in the molten extrudate. Blown film dies have a large surface area where the molten polymer is exposed to long residence time, and polyvinylidene chloride has a tendency to adhere to the metal. The long residence time results in degradation of the polyvinylidene chloride. Black, degraded polymer may form, which can then break loose and contaminate the film. This is an even bigger problem on large dies (those having a diameter of greater than about 8 inches) due to the increased surface area and higher metal temperature as a result of higher temperature skin polymers conducting heat to the die mandrel. The carbon build-up requires the manufacturer to shut down and clean the extrusion apparatus. The shutdown and cleaning of the extrusion apparatus results in high maintenance costs and lost production time.

Thus, it would be desirable to make a coextruded blown film containing a barrier material, to produce such a film on large dies, and to operate for long periods of time without shutdowns due to carbon formation.

SUMMARY OF THE INVENTION

These needs are met by the tubular, multilayer film, methods and apparatus of the present invention. The tubular, multilayer film includes a central barrier layer and a pair of adhesive layers on opposite sides of the central barrier layer. The adhesive layers completely cover the central barrier layer. Opposing edges of the central barrier layer overlap longitudinally along the tubular, multilayer film. The total thickness of the central barrier layers in the overlapping portion is substantially the same as the thickness of the central barrier layer in the non-overlapping portion. The tubular, multilayer film also includes inner and outer surface layers. The inner surface layer extends completely around the interior of the tubular, multilayer film, and the outer surface layer extends completely around the exterior of the tubular, multilayer film. This arrangement covers the encapsulated barrier layer and protects it from degradation. Additional layers may be included as needed.

The invention also involves a tubular film including a central barrier layer overlapping by at least an amount determined by Equation 1 along a weld line which extends longitudinally along the tubular film. The central barrier layer has substantially the same total thickness in the overlapping portion as in the non-overlapping portion. An inner adhesive layer and an outer adhesive layer are positioned on opposite sides of the central barrier layer. The adhesive layers completely encapsulate the central barrier layer. An inner surface layer is positioned inside the inner adhesive layer, and an outer surface layer is positioned outside the outer adhesive layer.

The central barrier layer is preferably made from a polymer selected from vinylidene chloride polymers and copolymers, ethylene vinyl alcohol polymers and copolymers, polyamide (Nylon) polymers and copolymers, and acrylonitrile polymers and copolymers. The adhesive layers are preferably made from a polymer selected from ethylene vinyl acetate (EVA) polymers and copolymers, ethylene methyl acrylate (EMA) polymers and copolymers, ethylene acrylic acid (EAA) polymers and copolymers, ionomers, and maleic anhydride grafted olefin polymers and copolymers. The surface layers are preferably made from a polymer selected from polyethylene polymers and copolymers, nylon and K-resins (styrene/butadiene block copolymers), ethylene vinyl acetate copolymer (EVA), polypropylene (PP) and polyethylene terephthalate (PET).

The present invention also includes a method of making a tubular, multilayer film. The method includes extruding a block of material having a barrier core and an adhesive covering the barrier layer core into a first stream having a generally annular cross-section. The first stream has a central barrier layer which overlaps longitudinally along the tubular, multilayer film, such that the total thickness of the central barrier layers in the overlapping portion is substantially the same as the thickness of the central barrier layer in the non-overlapping portion. An inner surface layer is extruded into a second stream having a generally annular cross-section. The second stream is positioned within the first stream and is joined thereto by the adhesive. An outer surface layer is extruded into a third stream having a generally annular cross-section. The third stream is positioned to surround the first stream and is joined thereto by the adhesive. The first stream is preferably extruded such that the opposing longitudinally extending edges of the central barrier layer overlap. The present invention also includes a method for coextruding a multilayer tubular film having a barrier material. A core extrudate of barrier material is extruded with a core extruder. A preencapsular extrudate of preencapsular material is extruded and directed to a preencapsulation die provided adjacent to the outlet of the core extruder. The core extrudate and the preencapsular extrudate are joined in the preencapsulation die in a coaxial relationship wherein the preencapsular extrudate is disposed radially outwardly of the core extrudate to form a preencapsulated core extrudate. An inner layer extrudate and an outer layer extrudate are extruded. The preencapsulated core extrudate is fed through a distribution manifold to a coextrusion die. The distribution manifold is designed to overlap opposing longitudinally extending edges. A multilayer blown film having the inner layer extrudate disposed radially inwardly of the preencapsulated core extrudate and the outer layer extrudate disposed radially outwardly of the preencapsulated core extrudate is formed. The coextrusion die has an annular channel adjacent to the distribution manifold to receive the preencapsulated core extrudate from the manifold channels. The depth of the annular channel is such that the flow of the polymer is not excessively restricted, and is preferably approximately twice the depth of the end of one manifold channel in the set distance.

The preencapsulation die preferably produces a preencapsulated core extrudate having non-uniform layer thicknesses. The preencapsulation die preferably has a first die gap and a second die gap, the first die gap being greater than the second die gap so that more polymer flows through the first die gap than through the second die gap.

The inner layer extrudate and the outer layer extrudate can be joined to the preencapsulated core extrudate either before or after the preencapsulated core extrudate is fed through the coextrusion die. Additional inner layers and outer layers can be included, if desired.

Another aspect of the invention is an extrusion apparatus for coextruding a multilayer film from a plurality of feed stock materials. The apparatus includes a core extruder for extruding a core extrudate, and a preencapsular extruder for extruding a preencapsular extrudate. A preencapsular transfer tube transfers the preencapsular extrudate to the preencapsulation die, which is disposed adjacent the outlet of the core extruder. A preencapsulated core extrudate transfer tube disposed downstream of the preencapsulation die transfers the preencapsulated core extrudate to the coextrusion die, which has a distribution manifold.

Another aspect of the invention is the distribution manifold. The distribution manifold includes a body having an inlet end and an outlet end, a manifold inlet at the inlet end of the body, and a pair of manifold channels. The pair of manifold channels has substantially the same length and extends from the manifold inlet around the body in opposite directions. Opposite ends of the manifold channels overlap each other by a set distance at a point opposite the manifold inlet. The opposite ends of the manifold channels are at different radial distances from the center of the body such that the preencapsulated core extrudate in the overlapping ends of the manifold channels remains separated. If the geometry is planar, the ends of the manifold channel will be at the same radial distance. The manifold channels decrease in the cross-sectional area from the manifold inlet to the opposite end. The manifold channels preferably have a streamlined shape, preferably a teardrop shape. The manifold channels preferably have an aspect ratio of height to depth of greater than 3:1. The distribution manifold preferably has a depression in the body located where the manifold channels overlap. The depression is at a first radial distance from the center of the body, and the set distance of the end of one manifold channel is located in the depression. There is an insert positioned over the depression. The insert is at a second radial distance from the center of the body, the second radial distance being greater than the first. The set distance of the end of the second manifold channel is located on the insert. The depression and the insert define a gap therebetween so that the preencapsulated core extrudate from the end of the manifold channel located in the depression flows through the gap.

Another aspect of the invention is a preencapsulation die for preencapsulating thermally sensitive polymer. The preencapsulation die includes a die body having an annular opening therethrough. The die body has a first member and a second member adjacent to the first member. The preencapsulation die includes an inner mandrel which extends circumferentially around the annular opening in the first member. The inner mandrel has a first surface and a second surface. The first surface is lower than the second surface whereby the first surface of the inner mandrel and the second member define a first die gap, and the second surface of the inner mandrel and the second member define a second die gap, the first die gap being greater than the second die gap. There is also a preencapsulation distribution manifold which extends circumferentially around the inner mandrel in the first member.

The preencapsulation die optionally includes a resin distribution channel extending about 180 degrees circumferentially around the preencapsulation distribution manifold in the first member. The resin distribution channel preferably terminates in an opening at each end. The openings in the resin distribution channel communicate with the preencapsulation distribution manifold. The resin distribution channel communicates with a resin inlet, which is located intermediate the openings in the resin distribution channel. The openings in the resin distribution channel are preferably positioned adjacent the first surface of the inner mandrel. The inner mandrel preferably has a pair of first surfaces and a pair of second surfaces. The first surfaces preferably extend approximately 60 degrees around the annular opening, and the second surfaces preferably extend approximately 120 degrees around the annular opening. The first surfaces are preferably positioned on opposite sides of the inner mandrel adjacent to the openings in the resin distribution channel, and the second surfaces are preferably positioned between the first surfaces on opposite sides of the inner mandrel.

The second member of the preencapsulation die can be flat. Alternatively, it could be a mirror image of the first member.

DETAILED DESCRIPTION OF THE INVENTION

Figure 1:
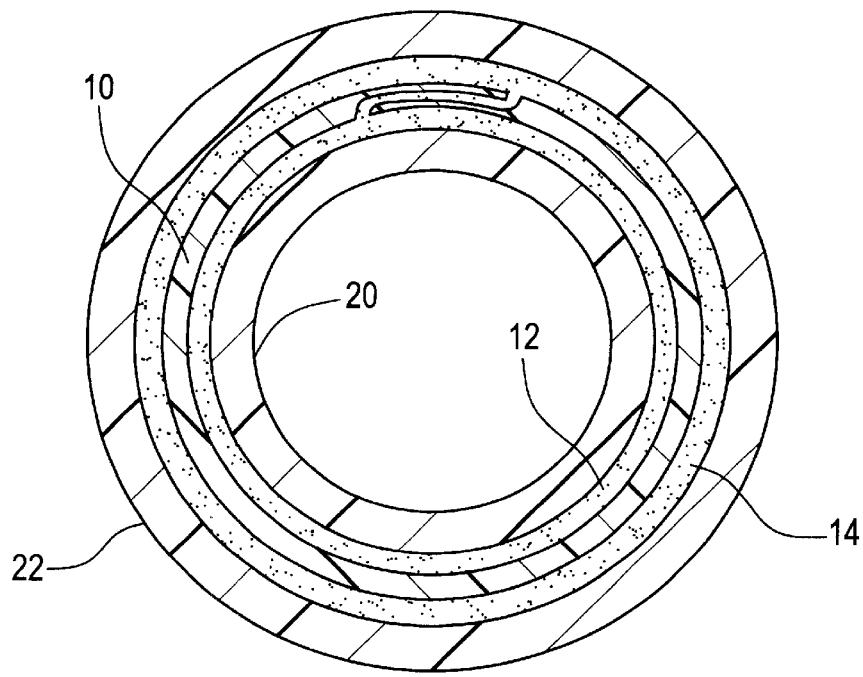
FIG. 1 is a cross-section of the multilayer, tubular extrudate of the present invention, with the individual layer thicknesses greatly exaggerated for purposes of illustration.
Figure 2:
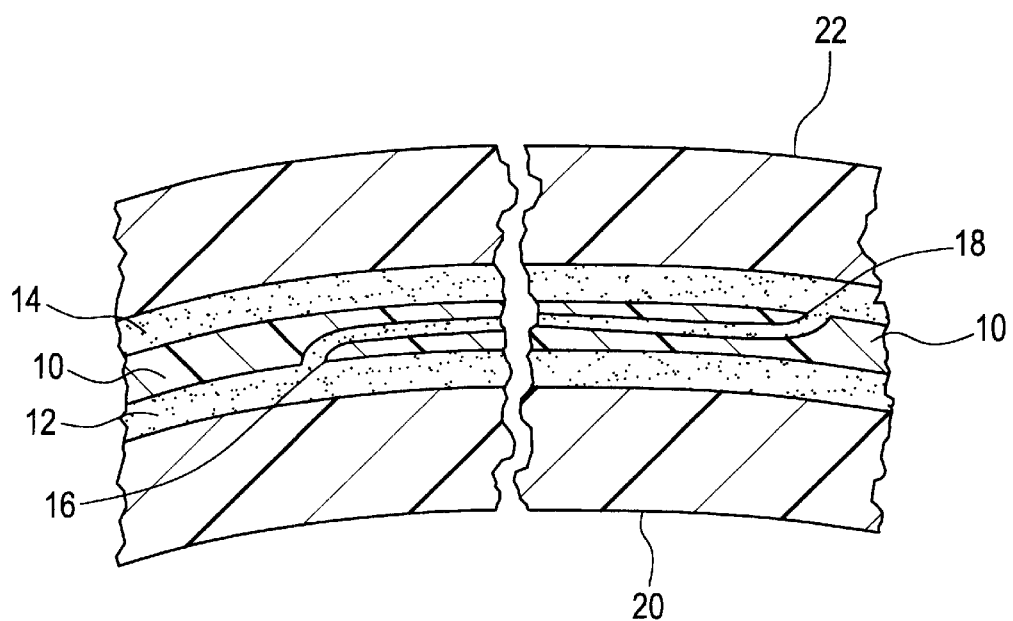
FIG. 2 is a partial cross-section of the extrudate in the region of the weld line, greatly exaggerated.

FIGS. 1 and 2 show cross-sectional views of the tubular, multilayer films of the present invention. For purposes of clarity in illustration, the thicknesses of the layers are exaggerated with respect to the size of the tubular laminate. The film comprises a central barrier layer 10, and a pair of adhesive layers 12 and 14 which are positioned on opposite sides of the central barrier layer 10. The central barrier layer 10 can be any barrier polymer, including, but not limited to, vinylidene chloride polymers and copolymers, ethylene vinyl alcohol polymers and copolymers, nylon polymers and copolymers, and acrylonitrile polymers and copolymers. The barrier layer is preferably a vinylidene chloride polymer or copolymer.

The adhesive layers 12 and 14 completely cover the central barrier layer 10. The adhesive layers 12 and 14 can be any one of a number of adhesives, including, but not limited to, EVA polymers and copolymers, EMA polymers and copolymers, EAA polymers and copolymers, ionomers, and maleic anhydride grafted olefin polymers and copolymers. When the central barrier layer is polyvinylidene chloride, the adhesive layer is preferably an ethylene vinyl acetate polymer or copolymer.

As best seen in FIG. 2, the opposing edges of 16 and 18 of the central barrier layer 10 overlap along the weld line. The thickness of the central barrier layers 10 in the overlapping portion is substantially the same as the thickness of the central barrier layer 10 in the non-overlapping portion. As a result of this arrangement, the film exhibits a substantially uniform oxygen transmission rate at all points around its circumference.

The multilayer film also includes inner and outer surface layers 20 and 22, respectively. The inner layer 20 extends completely around the interior of the tubular, multilayer film, and the outer layer 22 extends completely around the exterior of the film. The surface layers 20 and 22 can be made of any suitable polymer, including, but not limited to, polyethylene polymers and copolymers, polyamide (Nylon), K-resins (styrene/butadiene block copolymers), polypropylene, ethylene vinyl acetate copolymer and polyethylene terephthalate. The surface layers are preferably polyethylene when the central barrier layer is polyvinylidene chloride. For a more complete discussion of the materials which can be used for the central barrier (or core) layers, the adhesive layers, and the surface layers, see Lee, Jr. et al., U.S. Pat. No. 3,477,099, and Gould, et al., U.S. Pat. No. 4,842,791, which are incorporated herein by reference.

The adhesive layers 12 and 14 not only bond the central barrier layer 10 together in overlapping fashion at overlapping edges 16 and 18, but they also join inner and outer surface layers 20 and 22 to central barrier layer 10.

Additional layers can be included in the multilayer film as may be required for the particular application. The film can include adhesive layers to adhere the additional layers to the film. The additional layers can be added in the coextrusion die. Alternatively, they can be added in a feedblock prior to the die. Methods of including additional layers are well known to those of skill in the art. The number of layers in the multilayer film is not critical.

The tubular, multilayer film of the present invention is formed by extrusion. A co-extrusion die, such as shown in U.S. Pat. No. 4,365,949, which is incorporated herein by reference, is utilized to coextrude three laminate layers simultaneously. Polyethylene extrusion blocks are supplied to the die to extrude the inner and outer surface layers 20 and 22 respectively. An extrusion block containing a central barrier layer, such as polyvinylidene chloride, which is completely encapsulated in an adhesive layer is provided to the inlet opening of the die communicating with the middle extrusion passage, as will be discussed below. The central barrier layer/adhesive composite extrusion block is extruded into a first stream having a generally annular cross-section. The middle extrusion passage is configured to ensure that there is an overlap of the central barrier layer along the weld line such that the thickness in the overlap portion is substantially the same thickness as in the non-overlapped portion, as will be discussed below. Because of this, the overlap produces an oxygen transmission rate in the region of the weld line which is comparable to that provided in other areas of the film.

Figure 3:
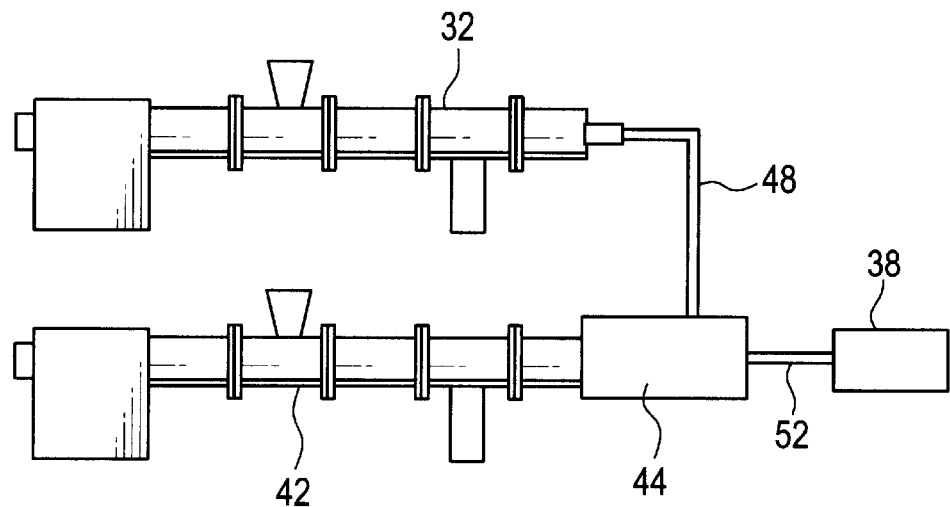
FIG. 3 is a diagram of the overall process of the present invention.

FIG. 3 shows the general layout of an extrusion line using two extruders to produce a preencapsulated core extrudate for use in making the multilayer film of the present invention. A core extruder 42 feeds a core extrudate of molten barrier material into a preencapsulation feedblock 44. Preencapsular extruder 32 feeds preencapsular extrudate of preencapsular material to the preencapsulation feedblock 44 through a preencapsular transfer tube 48. In the preencapsulation feedblock 44, the core extrudate is surrounded by an annular layer of preencapsular material. This preencapsulated core extrudate flows through the preencapsulated core extrudate transfer tube 52 to the coextrusion die 38.

The molten core layer and preencapsulation layer are joined near the tip of the screw of the core extruder. This minimizes the exposure of the core material to the walls of the extrusion equipment. This is particularly important for a thermally sensitive polymer, such as polyvinylidene chloride.

Figure 4:
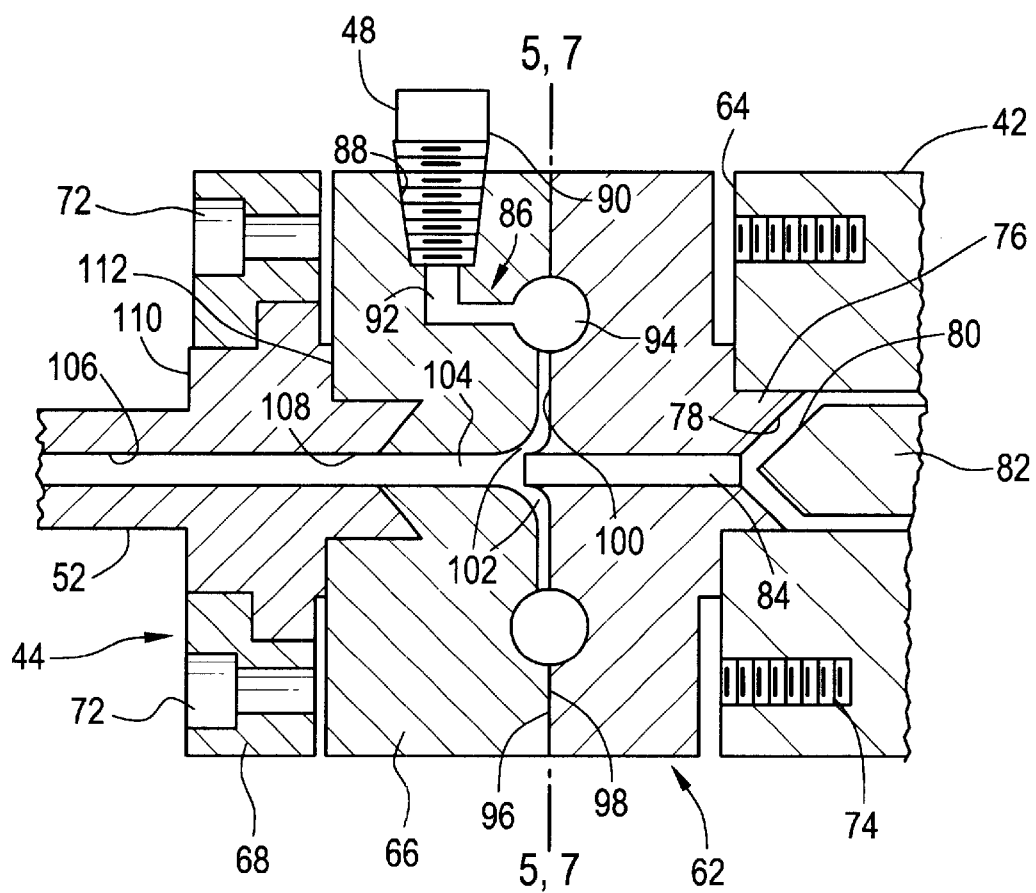
FIG. 4 is a cross-section of one embodiment of the preencapsulation die of the present invention.

FIG. 4 shows the details of the preencapsulation feedblock 44. Gould et al., U.S. Pat. No. 4,842,791, which is incorporated herein by reference, discloses a similar preencapsulation feedblock. The preencapsulation feedblock 44 includes an axially arrayed series of members which define a series of pathways for directing the flow of the core extrudate and the preencapsular extrudate. The preencapsulation feedblock 44 includes an inner member 62 disposed adjacent to the downstream end 64 of core extruder 42, a middle member 66 disposed axially outwardly from the inner member 62, and an outer member 68 disposed axially outwardly from middle member 66. The inner, middle, and outer members 62, 66, 68 are placed in an end-to-end, colinear relation, and are disposed between the downstream end 64 of the core extruder 42 and the upstream end of transfer tube 52. The inner, middle, and outer members 62, 66, and 68 are mounted to the core extruder by bolts 72 which pass through aligned openings in the inner, middle, and outer members 62, 66, 68. The bolts 72 are threadedly engaged in axially outwardly opening apertures 74 in the core extruder 42.

Inner member 62 is generally disk shaped, and includes an axially extending leg 76 having a conically shaped axially extending inner end 78. The conically shaped axially extending inner end 78 is disposed in a spaced, parallel relation to the downstream end 80 of the extrusion advancing screw 82 of the core extruder 42. Inner member 62 also includes an axially extending central pathway 84. The downstream end 80 of the extrusion advancing screw 82, and the conically shaped axially extending inner end 78, and central pathway 84 of the inner member 62 define a core extrudate pathway through which the core extrudate flows immediately after its extrusion by the core extruder 42.

Likewise, inner member 62 and middle member 66 cooperate to define a preencapsular extrudate pathway 86 in the preencapsulation feedblock 44 for directing preencapsular extrudate to the stream of core extrudate flowing through the central pathway 84. The preencapsular extrudate pathway 86 includes an inlet portion 88 for receiving the downstream end 90 of the preencapsular extrudate transfer tube 48, and thus for receiving the preencapsular extrudate flowing therein. The preencapsular extrudate pathway 86 also includes an L-shaped (in cross-section) portion 92 having a radially inwardly extending leg and an axially inwardly extending leg. The L-shaped portion 92 is disposed downstream from the inlet portion 88 and directs the preencapsular extrudate to a preencapsulation distribution manifold 94 formed between the axially extending outer surface 96 of inner member 62 and the axially inner surface 98 of middle member 66. A radially inwardly extending inner mandrel 100 extends between the preencapsulation distribution manifold 94 and the outlet portion 102 of the preencapsular extrudate pathway 86. The outlet portion 102 circumferentially surrounds the downstream end of the central pathway 84, and extends generally axially to direct the flow of the preencapsular extrudate in an axial direction, so that the preencapsular extrudate flowing out of the outlet portion 102 joins the core extrudate flowing out of the central pathway 84 in a coaxial, surrounding relation in the preencapsulated core extrudate pathway 104.

The preencapsulated core extrudate pathway 104 is disposed colinearly with the central pathway 84 and has a cross-sectional area generally equal to the combined cross-sectional areas of the outlet portion 102 of the preencapsular extrudate pathway 86 and the central pathway 84, so that the flows of core and preencapsular material are not substantially restricted in preencapsulated core extrudate pathway 104. Preencapsulated core extrudate transfer tube 52 includes interior passageway 106 having an upstream end 108. The upstream end 108 of the interior passageway 106 of the preencapsulated core extrudate transfer tube 52 is disposed colinearly with, and has generally the same cross-sectional area as the preencapsulated core extrudate pathway 104 so as not to introduce perturbations in the flow of the preencapsulated core extrudate as it moves from pathway 104 into the interior passageway 106. A collar 110 is formed at, or fixed to, the upstream end 108 of preencapsulated core extrudate transfer tube 52. The collar 110 is mateable with the axially outwardly facing surface 112 of middle member 66, for properly positioning preencapsulated core extrudate transfer tube 52 on the preencapsulation feedblock 44. The ring-shaped outer member 68 of the preencapsulation feedblock 44 serves as a yoke for maintaining the collar 110 in the preencapsulation feedblock 44.

Figure 5:
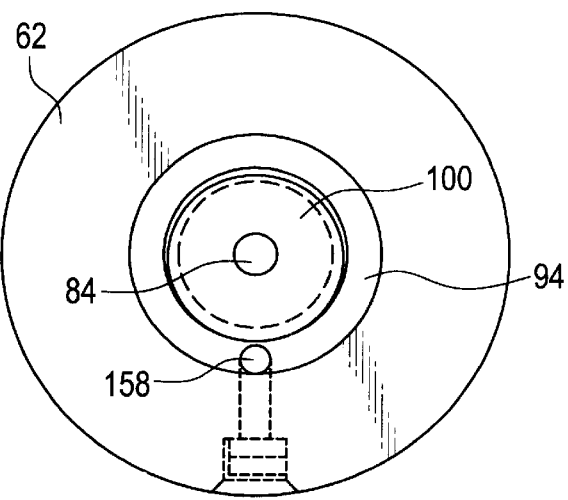
FIG. 5 is a plan view of one embodiment of the preencapsulation die of the present invention.
Figure 6:
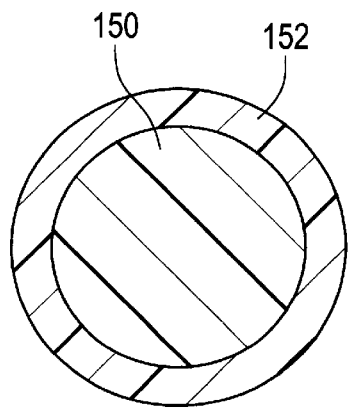
FIG. 6 is a schematic of a cross-section of the preencapsulated core extrudate having uniform layer thicknesses produced by the preencapsulation die of FIG. 5.

FIG. 5 shows a plate of one embodiment of the preencapsulation die. Middle member 66 (shown in FIG. 4) has a central pathway 84. An inner mandrel 100 extends circumferentially around the central pathway 84. A preencapsulation distribution manifold 94 extends circumferentially around the inner mandrel 100. There is a resin inlet 158 in the preencapsulation distribution manifold 94. The inner mandrel 100 is flat. As a result, the die gap between the inner mandrel 100 and the surface 96 of the inner member 62 (shown in FIG. 4) is the same at all point around the circumference of the die. This produces a preencapsulated core extrudate as shown in FIG. 6. The preencapsulated core extrudate has a pr encapsulation layer 152 positioned annularly around the core layer 150. The preencapsulation layer 152 has a uniform thickness around th round core layer 150. The surface of the inner member 62 can be a mirror image of the die plate shown in FIG. 5. Alternatively, for ease of construction, it is preferable that the surface of inner member 62 be flat.

A preencapsulated core extrudate with uniform layer thicknesses is not always the preferred structure to send to the tubular coextrusion die. In some cases, when the preencapsulated core extrudate has uniform layer thicknesses, the tubular film produced does not have the desired barrier layer in the overlap. Too much preencapsular material flows into the overlap area, resulting in a thick layer of preencapsular material and a thin barrier layer in the overlap area.

Figure 7:
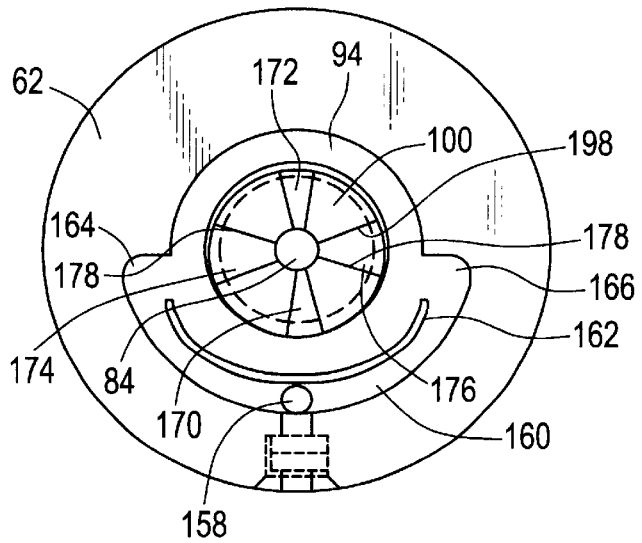
FIG. 7 is a plan view of another embodiment of the preencapsulation die of the present invention.

The thickness of the encapsulation layer around the core material can be controlled selectively. This is done by creating a gap in the preencapsulation die land area having different thicknesses around its circumference, thus promoting or retarding flow through those areas of the die. This allows better control of the final layer thickness profiles for each individual layer in the final film structure. The shaping of the preencapsular material results in a more uniform core layer and preencapsular layer in the overlap. FIG. 7 shows a plate of an alternate embodiment of the preencapsulation die. In this embodiment, the die has a non-uniform die gap. Middle member 66 (shown in FIG. 4) has a preencapsulation distribution manifold 94, an inner mandrel 100, and a central pathway 84, as before. There is a resin distribution channel 160 which extends circumferentially about 180 degrees around the preencapsulation distribution manifold 94. The resin distribution channel 160 is separated from the preencapsulation distribution channel 94 by a wall 162. There are openings 164 and 166 on each end of the resin distribution channel 160 which allow resin to flow from the resin distribution channel 160 into the preencapsulation distribution manifold 94. The resin inlet 158 is located about midway between the ends of the resin distribution channel 160.

Figure 8:
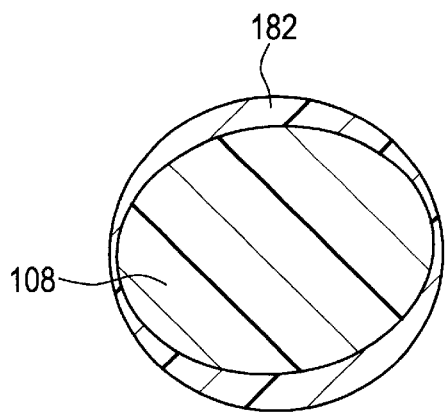
FIG. 8 is a schematic of a cross-section of the preencapsulated core extrudate having non-uniform layer thicknesses produced by the preencapsulation die of FIG. 7.

The inner mandrel 100 has a pair of first surfaces 170 and 172 and a pair of second surfaces 174 and 176. The first surfaces 170 and 172 are lower than the second surfaces 174 and 176. When paired with either a flat surface or a mirror image on the surface 96 of inner member 62, this produces a bigger die gap between the inner mandrel 100 and the surface 96 of the inner member 62 at the first surfaces 170 and 172 than at second surfaces 174 and 176. The bigger die gap allows more polymer to flow through first surfaces 170 and 172, which produces non-uniform layer thicknesses as shown in FIG. 8. The preencapsulation layer 182 is thicker at the top and bottom than on the sides.

The first surfaces 170 and 172 of the inner mandrel produce the thicker top and bottom portions of the preencapsulation layer, and second surfaces 174 and 176 produce the thinner side portions. It was expected that the first surfaces should be larger than the second surfaces to obtain the shape shown in FIG. 8. However, initial experiments in which the first surfaces were much larger than the second surfaces did not yield the desired shape. Surprisingly, it was discovered that in order to produce a preencapsulated core extrudate as shown in FIG. 8, the first surfaces 170 and 172 should extend for approximately 60 degrees around the central pathway 84 on opposite sides of the inner mandrel 100, and the second surfaces 174 and 176 should ex end for approximately 120 degrees. Other designs are possible depending on the desired profile of the preencapsulated core extrudate and the particular materials to be used in the film.

The transition 178 between first surfaces 170 and 172 and second surfaces 174 and 176 is preferably inclined to allow smooth polymer flow from the deeper portion to the shallower portion.

Figure 9:
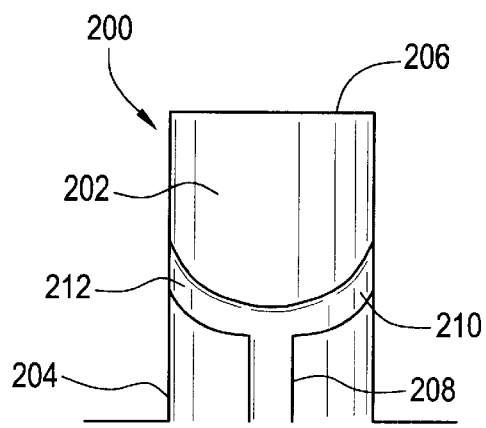
FIG. 9 is a plan view of one side of the distribution manifold of the present invention.
Figure 10:
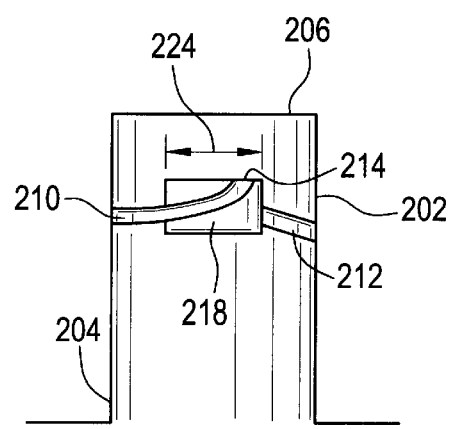
FIG. 10 is a plan view of the opposite side of the distribution manifold of the present invention with the insert installed.
Figure 11:
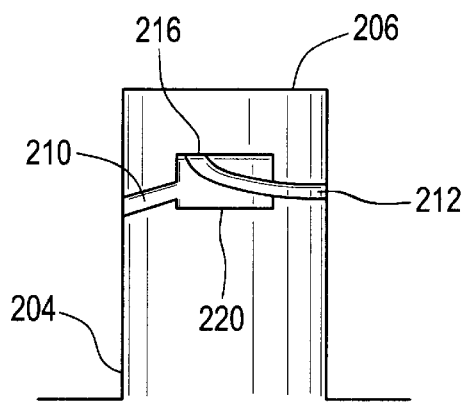
FIG. 11 is a plan view of the side of the distribution manifold shown in FIG. 8 without the insert installed.

The preencapsulated core extrudate is sent to a tubular die where it flows through a distribution manifold to produce a tubular structure in which the ends of the core layer are overlapped. A representative cylindrical distribution manifold is shown in FIGS. 9–11. FIG. 9 shows the inlet side of the distribution manifold 200, and FIGS. 10 and 11 show the opposite side. The distribution manifold 200 has a body 202. The body has an inlet end 204 and an outlet end 206. The body 202 can be cylindrical or other suitable shape. It can be a straight cylinder in which the inlet end 204 and the outlet end 206 are the same diameter. Alternatively, the cylinder can be tapered, with either the inlet end 204 being larger in diameter than the outlet end 206, or the inlet end 204 being smaller in diameter than the outlet end 206.

There is a resin inlet 208 near the inlet end 204 of the body 202. The resin inlet 208 is connected to a pair of manifold channels 210 and 212. The pair of manifold channels 210 and 212 has substantially the same length. They extend from the resin inlet 208 around the body 202 in opposite directions. The pair of manifold channels 210 and 212 preferably spiral upward from the inlet end 204 toward the outlet end 206 of the body 202. On the opposite side of the body 202, the ends 214 and 216 of the manifold channels 210 and 212 overlap each other. The manifold channels decrease in cross-sectional area from the resin inlet 208 to the ends 214 and 216.

FIGS. 10 and 11 show one embodiment of how to achieve the overlap of the core layer. Manifold channel 210 spirals upward toward the outlet end 206 of the body 202. Manifold channel 210 extends onto an insert 218, and continues to end 214. Underneath the insert 218, there is a depression 220. Manifold channel 212 extends into the depression 220 and continues to end 216. Because the end 216 of manifold channel 212 is in depression 220 and the end 214 of manifold channel 210 is on insert 218, the ends 214 and 216 of the manifold channels 210 and 212 are at different radial distances from the center of body 202.

When the insert 218 is in place, resin flows through manifold channel 212 to end 216 underneath the insert 218.

At the same time resin flows through manifold channel 210 to end 214. There is a set distance 224 of overlap by the ends 214 and 216 of the manifold channels 210 and 212. The resin in the ends 214 and 216 of manifold channels 210 and 212 remains separated by the insert 218.

For a uniform total barrier layer thickness, the minimum set distance 224 of overlap depends on the particular barrier material being used and the thickness of the barrier film layer. The set distance needed for a specific barrier material and thickness of barrier film layer can be determined by Equation 1.

$$OL = PE/PB \times BLT \qquad \text{Equation 1}$$

Where:

OL=Overlap Length;
PE=Permeability per mil of the Encapsulation material;
PB=Permeability per mil of the Barrier material;
BLT=Barrier Layer Thickness.

The permeabilities in Equation 1 are for the permeant molecule of interest. As used herein, the term "permeant" refers to a gas or vapor that passes through a polymeric material. Since the permeabilities of resins can differ substantially for different permeants, the necessary overlap length may vary depending on choice of permeant. Table 1 shows an example of necessary overlap lengths based on oxygen permeability for specific vinylidene chloride copolymer (SARAN™) and tie layer material (EVA) combinations.

| Barrier Material | Barrier Perm.* | Barrier Thick. (in.) | Encaps. Material | Encaps Perm.* | Overlap Length (in.) |
|---|---|---|---|---|---|
| SARAN | 0.08 | 0.005 | EVA | 400 | 2.5 |
| SARAN | 0.08 | 0.002 | EVA | 400 | 1.0 |
| SARAN | 0.08 | 0.005 | Grafted HDPE | 150 | 0.94 |

*Permeability in cc/100 sq. in.-day-atm

Figure 12:
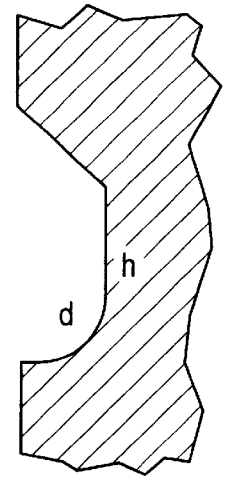
FIG. 12 is a cross-section of the manifold channels in the distribution manifold.

The manifold channels may be designed to assist in producing an encapsulated structure with uniform layers. Since the manifold will contain an encapsulated structure, the effects of viscous encapsulation and elastic layer rearrangement should be minimized in order to maintain a uniform layer structure as it flows down the manifold channel. These effects can be minimized by using channels that are streamlined and use large radii in any corners. One preferred channel geometry for producing uniform layers would be a teardrop shape manifold with an aspect ratio of height to depth of greater than 3:1. FIG. 12 shows one example of a preferred manifold channel having a height to depth ratio (h:d) of greater than 3:1.

EXAMPLE 1

A copolymer of polyvinylidene chloride and methyl acrylate (including typical additives) was fed through a core extruder with a diameter of 4.45 cm and a length to diameter ratio 24:1. The temperature of the core extruder was controlled in three barrel zones: 149° C./154° C./154° C. for the feed/transition/metering sections of the core extruder, respectively. A screw speed of 35 rpm was used in the primary extruder resulting in an output rate of 17 kg/hr.

An ethylene vinyl acetate resin with a melt flow of 6 gm/10 min. and 28% vinyl acetate was fed through a side arm extruder with a diameter of 3.18 cm and a length to diameter ratio of 20:1. The temperature of the side arm extruder was controlled in three barrel zones: 121° C./149°

C./149° C. for the feed/transition/meter sections of the side arm extruder, respectively. A screw speed of 18 rpm was used in the side arm extruder, resulting in an output rate of 2 kg/hr.

The melt streams of the copolymer of polyvinylidene chloride and methyl acrylate from the core extruder and ethylene vinyl acetate from the side arm extruder were fed into a preencapsulation feedblock as described above. The layer thickness of the ethylene vinyl acetate layer was controlled to produce the desired layer thickness in the final product, as shown in FIG. 8. From the feedblock, the encapsulated material was passed through a crosshead style blown film die manifold in which the ends of the manifold were overlapped, as described above. The encapsulated structure was joined with two ethylene vinyl acetate adhesive layers and two polyethylene layers in an A/B/C/B/A structure (where A is polyethylene, B is ethylene vinyl acetate adhesive layer, and C is the copolymer of polyvinylidene chloride and methyl acrylate encapsulated in ethylene vinyl acetate) to produce the final blown film structure.

EXAMPLE 2

In order to evaluate the effect of the preencapsulation die, blown film was produced using the encapsulation dies shown in FIGS. 5 and 7. The film incorporated a polyvinylidene chloride central barrier layer, and ethylene vinyl acetate adhesive layers. In the first run with the uniform die gap in the preencapsulation die, it was difficult to see the layer thicknesses. As a result, the layer thicknesses were increased when the film with the non-uniform die gap in the preencapsulation die was produced in order to see the layers better.

The film was tested for oxygen permeability. The results are shown in Table 2.

TABLE 2

Uniform Die Gap v. Non-Uniform Die Gap In Preencapsulation Die

| Run | Die Gap | (1) Permeability* (In Overlapped Region (−2 in. to +2 in.)** | (2) Permeability* (Away from Overlapped Region (+18 in. to +22 in.)** | Permeability Ratio - ((1)/(2)) |
|---|---|---|---|---|
| 1 | Uniform | 1.40 | 0.30 | 4.6 |
| 2 | non-uniform | 0.18 | 0.13 | 1.38 |

*Permeability in cc/100 sq.in.-day-atm
**4-inch diameter piece of film used for barrier measurement.

TABLE 3

Total Percent Saran Vs. Position Around Film

| Position (In)* | Uniform Insert SARAN | Non-uniform Insert SARAN |
|---|---|---|
| −22 | 15.4 | 14.5 |
| −14 | 15.9 | — |
| −10 | 16 | 15.2 |
| −6 | 14 | 12.9 |
| −5 | 14.8 | — |
| −4 | 13.9 | — |
| −3 | 11.6 | 13.3 |
| −2 | 8.1 | 11.3 |
| −1 | 2.6 | 10.5 |
| 0 | 5 | 11.9 |
| +1 | 6.2 | 11.9 |
| +2 | 9.5 | 9 |
| +3 | 10.9 | 10.2 |

TABLE 3-continued

Total Percent Saran Vs. Position Around Film

| Position (In)* | Uniform Insert SARAN | Non-uniform Insert SARAN |
|---|---|---|
| +4 | 14.7 | 14.9 |
| +5 | 15.3 | — |
| +6 | 16.6 | — |
| +10 | 15.4 | 16 |
| +14 | 16.4 | — |
| +22 | 15.4 | 14.5 |

*Position = Distance from the point opposite the entry port of the SARAN extruder The increase in the layer thicknesses with the shaped preencapsulation accounts for the differences in the absolute values of the permeability. The film produced with the uniform die gap in the preencapsulation die did not have a uniform barrier layer around the circumference of the tube. The increased permeability at the overlap region shows that the barrier layer at the weld was not uniform. In contrast, the film made with the non-uniform die gap in the preencapsulation die had a permeability at the overlap region which was close to the permeability away from the overlap region.

While certain representative embodiments and details have been shown for purposes of illustrating the invention, it will be apparent to those skilled in the art that various changes in the compositions, methods, and apparatus disclosed herein may be made without departing from the scope of the invention, which is defined in the appended claims.

What is claimed is:

1. A method for coextruding a multilayer tubular film having a barrier material comprising:

extruding a core extrudate of barrier material wit a core extruder;

providing a preencapsulation die adjacent the outlet of the core extruder, the preencapsulation die capable of producing a non uniform layer thickness;

extruding a preencapsular extrudate of preencapsular material and directing said preencapsular extrudate to the preencapsulation die;

joining the core extrudate and the preencapsular extrudate in the preencapsulation die in a coaxial relationship wherein the preencapsular extrudate is disposed radially outwardly of the core extrudate to form a preencapsulated core extrudate having a non-uniform layer thickness;

extruding an inner layer extrudate and an outer layer extrudate;

feeding the preencapsulated core extrudate through a distribution manifold to a coextrusion die, the distribution manifold designed to overlap opposing longitudinally extending edges; and forming a multilayer blown film having the inner layer extrudate disposed radially inwardly of the preencapsulated core extrudate and the outer layer extrudate disposed radially outwardly of the preencapsulated core extrudate.

2. The method of claim 1 wherein the inner layer extrudate and the outer layer extrudate are joined to the preencapsulated core extrudate before the preencapsulated core extrudate is fed through the coextrusion die.

3. The method of claim 1 wherein the inner layer extrudate and the outer layer extrudate are joined to the preencapsulated core extrudate while the preencapsulated core extrudate is fed through the coextrusion die.

4. The method of claim 1 further comprising extruding a second inner layer extrudate disposed inwardly of the inner layer extrudate and a second outer layer extrudate disposed outwardly of the outer layer extrudate.

5. The method of claim 1 wherein the set distance of overlap is at least about an amount as determined by the Equation 1

$$OL = PE/PB \times BLT \qquad \text{Equation 1}$$

Where:

OL=Overlap Length;
PE=Permeability per mil of the Encapsulation material
PB=Permeability per mil of the barrier material;
BLT=Barrier Layer Thickness.

6. The method of claim 1 wherein the preencapsular extrudate surrounds the core extrudate to form a preencapsulated core extrudate.

7. The method of claim 1 wherein the distribution manifold comprises a body having an inlet end and an outlet end, an manifold inlet near the inlet end of the body, and a pair of manifold channels extending from the manifold inlet around the body in opposite directions, opposite ends of the manifold channels overlapping each other such that the preencapsulated core extrudate in the overlapping ends of the manifold channels remains separated.

8. The method of claim 7 wherein the pair of manifold channels have substantially the same length.

9. The method of claim 7 wherein the opposite ends of the manifold channels are at different radial distances from a center of the body.

10. The method of claim 7 wherein the manifold channels have a streamlined shape.

11. The method of claim 7 wherein the manifold channels have a teardrop shape.

12. The method of claim 7 wherein the manifold channels have an aspect ratio of height to depth of greater than 3:1.

13. The method of claim 7 wherein the set distance of overlap is at least about an amount as determined by Equation 1

$$OL = PE/PB \times BLT \qquad \text{Equation 1}$$

Where:

OL=Overlap Length:
PE=Permeability per mil of the Encapsulation material
PB=Permeability per mil of the barrier material:
BLT=Barrier Layer Thickness.

14. The method of claim 7 further comprising a depression in the body located where the manifold channels overlap, the set distance of the end of one manifold channel being located in the depression, and an insert positioned over the depression, the depression and the insert defining a gap therebetween so that the preencapsulated core extrudate from the end of the manifold channel located in the depression flows through the gap.

15. The method of claim 7 wherein the body is a cylinder.

16. The method of claim 15 wherein the cylinder is tapered.

17. The method of claim 7 wherein the body is planar.

18. The method of claim 1 additionally comprising: transferring the preencapsular extrudate to the preencapsulation die using a preencapsular core extrudate transfer tube.

19. The method of claim 7 additionally comprising: transferring the preencapsulated core extrudate to the coextrusion die using a preencapsulated core extrudate transfer tube disposed downstream of the preencapsulation die.

* * * * *